United States Patent

[11] 3,619,756

| [72] | Inventors | Ernest M. Rossini<br>Bronxville, N.Y.;<br>Edgar R. Lodi, York, Pa. |
|---|---|---|
| [21] | Appl. No. | 843,013 |
| [22] | Filed | July 18, 1969 |
| [45] | Patented | Nov. 9, 1971 |
| [73] | Assignee | AMF Incorporated |
| [32] | Priority | Aug. 22, 1968 |
| [33] | | Great Britain |
| [31] | | 40,207/68 |

[54] SERVO DRIVE PROGRAM CONTROL
19 Claims, 5 Drawing Figs.

| [52] | U.S. Cl. | 318/603 |
|---|---|---|
| [51] | Int. Cl. | G05b 19/28 |
| [50] | Field of Search | 318/20.320, 20.105, 603; 328/43 |

[56] References Cited
UNITED STATES PATENTS

| 3,080,511 | 3/1963 | Coady-Farley et al. | 318/28 |
|---|---|---|---|
| 3,084,315 | 4/1963 | Coady-Farley et al. | 318/162 |
| 3,234,361 | 2/1966 | McLaren et al. | 318/18 UX |
| 3,251,030 | 5/1966 | Bolton et al. | 328/43 X |
| 3,414,785 | 12/1968 | Orahood et al. | 318/18 |
| 3,493,827 | 2/1970 | Tinkler | 318/603 X |
| 3,519,904 | 7/1970 | Rogers | 318/603 X |
| 3,523,231 | 8/1970 | Arthur et al. | 318/603 X |
| 3,532,955 | 10/1970 | Henegar | 318/603 X |

*Primary Examiner*—B. Dobeck
*Attorneys*—George W. Price and Eli Weiss

ABSTRACT: In this invention, a servo drive coupled to drive a member such as an articulated arm along a desired path is controlled (programmed) by a counter which sequentially selectively couples signal generating means such as impedances to the servo drive, where each impedance generates a signal which is representative of a discrete physical displacement, of the servo drive.

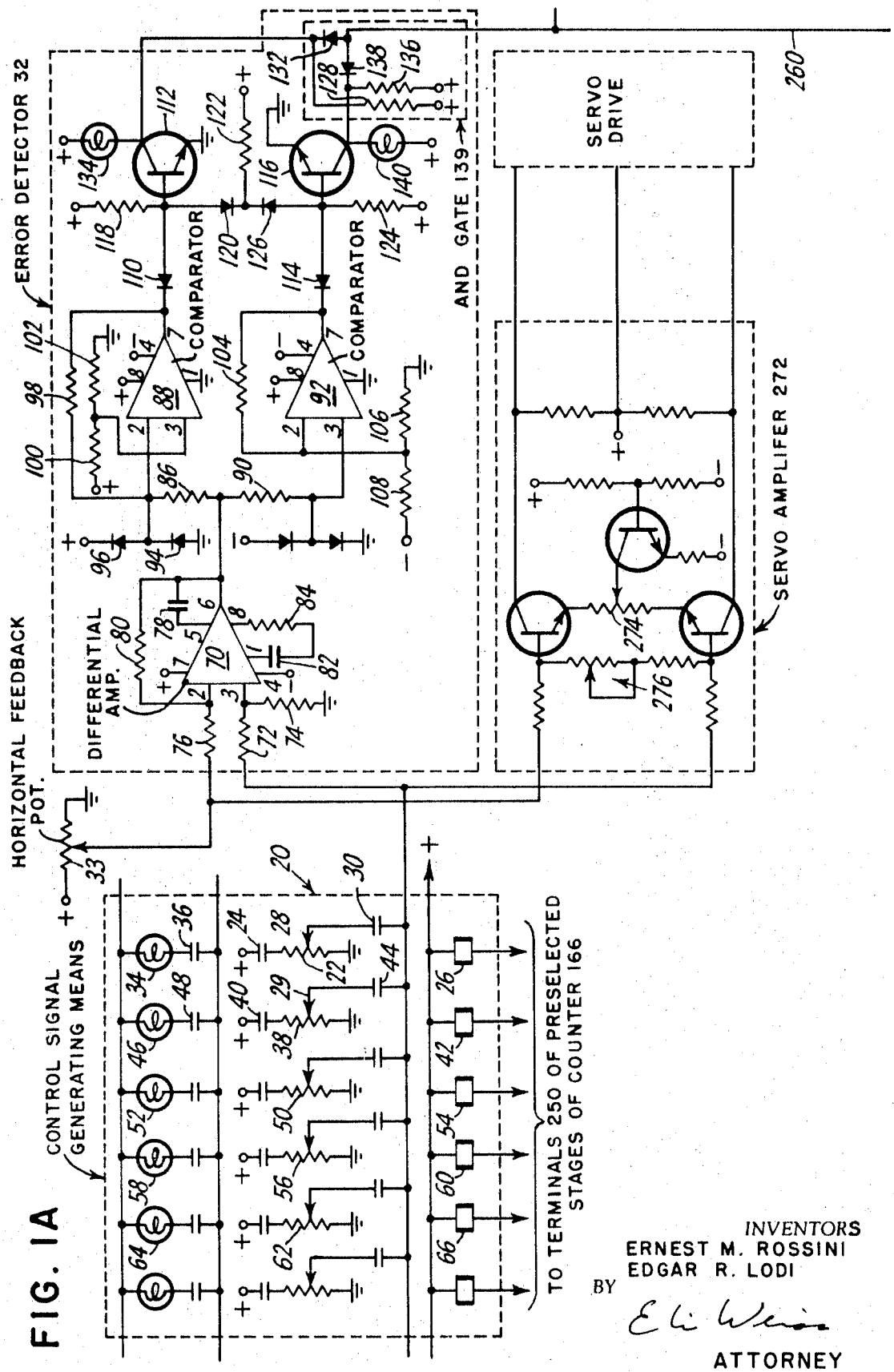

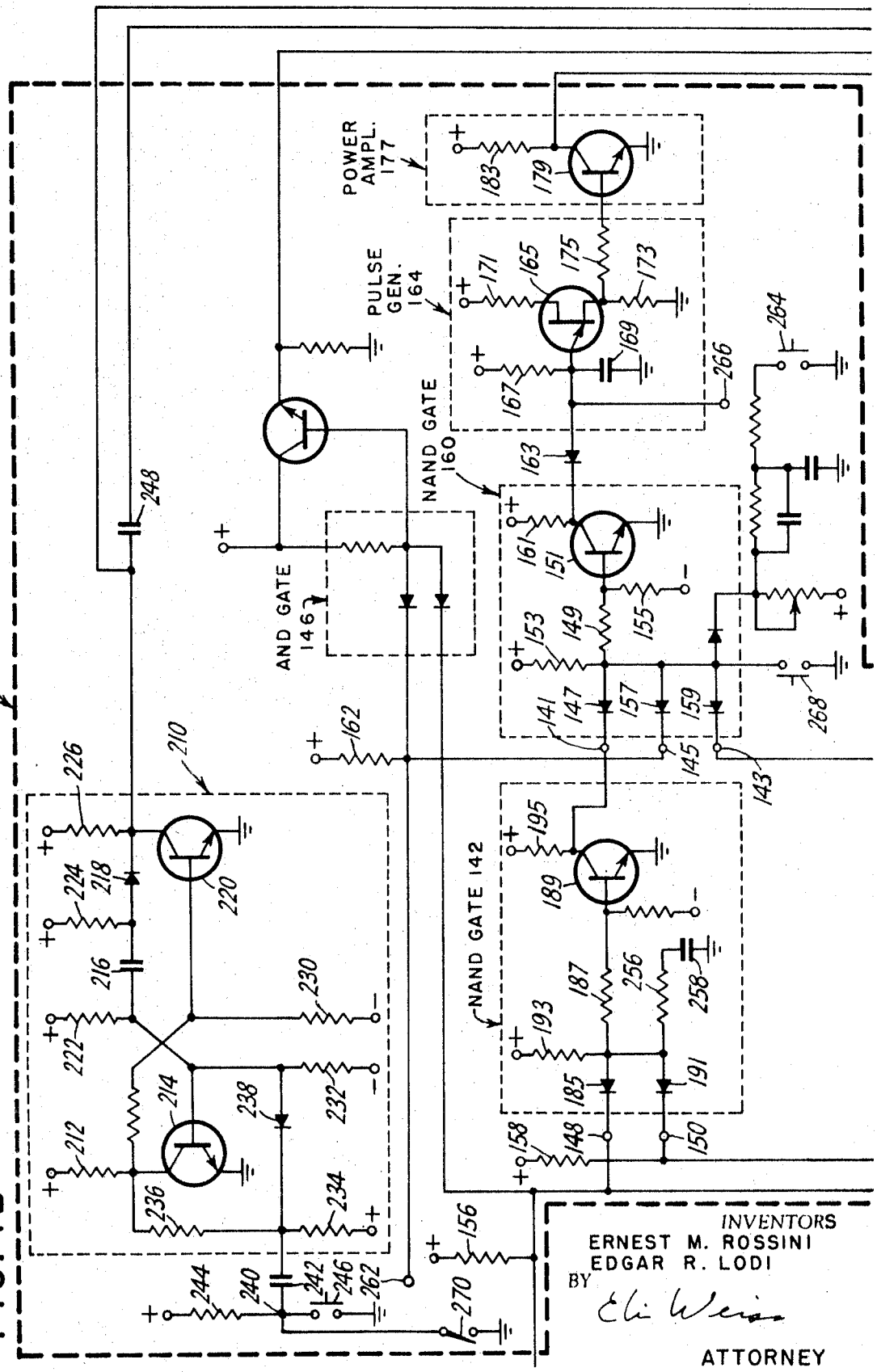

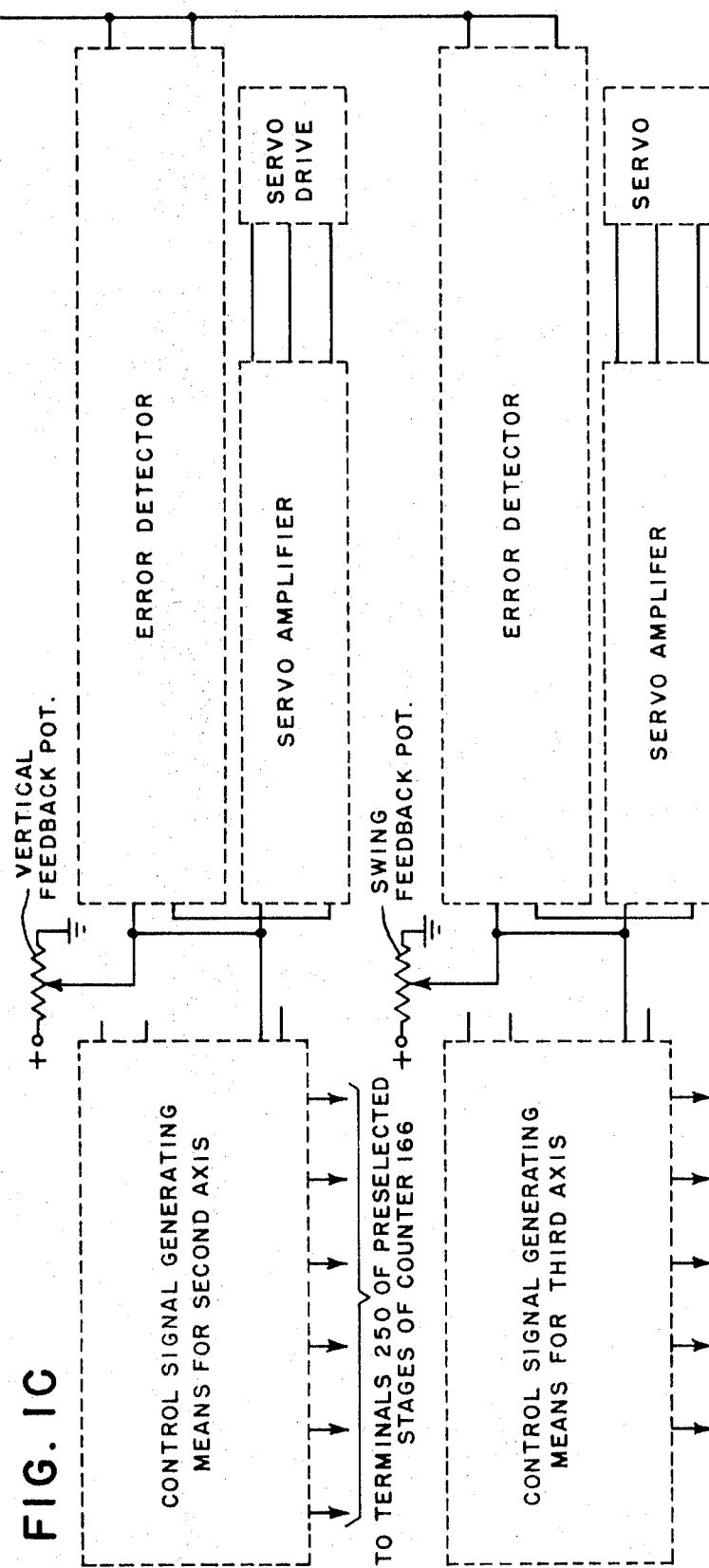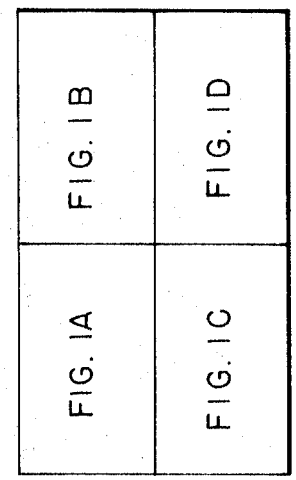

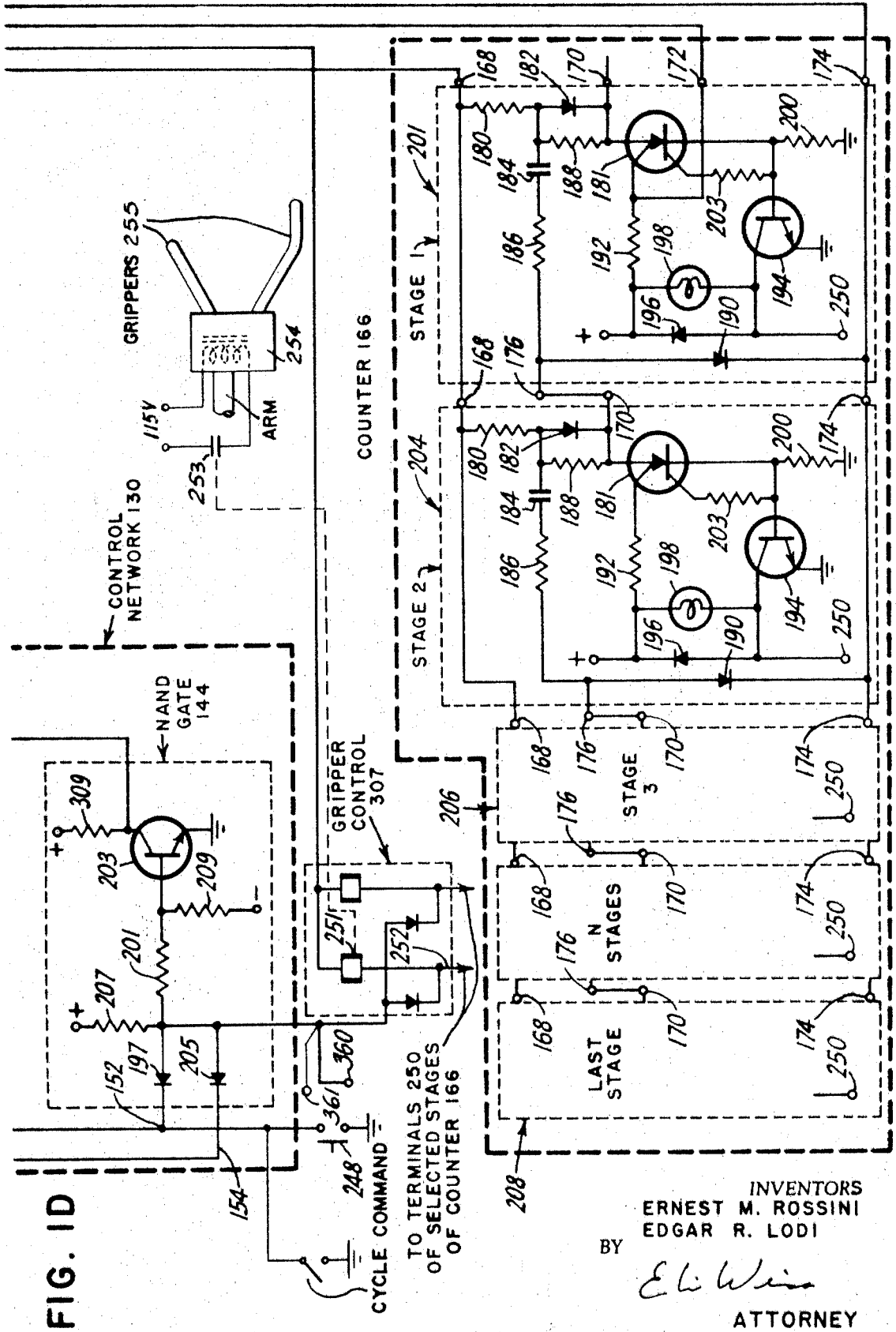

SERVO DRIVE PROGRAM CONTROL

This invention relates generally to a servo drive system and, more particularly, to a synchronous drive system which can be programmed to position sequentially an articulated arm to a plurality of discrete preselected positions in space.

In automated assembly line operations, increasing reliance is being placed upon mechanisms which can be used to reduce or eliminate hand operations. One such mechanism or device is, in essence, an articulated arm having a work holding member such as grippers or the like positioned at the free end thereof. In operation, the articulated arm is programmed to move through a work cycle consisting of a plurality of discrete positions. An example of an articulated arm program may well be the positioning of the articulated arm to at least six discrete positions as follows: Positioning of the arm over a workpiece, lowering the arm to engage the workpiece, engaging and raising the workpiece, positioning the workpiece first over and then into a jig on a drill press for drilling, removing the workpiece from the jig and positioning it on to a conveyor belt, and then disengaging itself from the workpiece and moving into position to engage another workpiece.

Usually, the articulated arm is coupled to and is driven by a servo drive system, a servo drive usually being provided for each axis or freedom of motion of the articulated arm desired. Naturally, successful operation of the articulated arm is dependent upon the ability of each of the servo drives to be accurately programmed to sequentially position the articulated arm repeatedly to preselected discrete locations.

It is an object of the present invention to provide an improved servo drive system which can be programmed to sequentially effect preselected physical displacements.

It is also an object of the present invention to provide an improved program control means that is both versatile in operation and can be used with a servo drive system.

It is still another object of the present invention to provide an improved servo drive system which is reliable in operation and economical to build.

These and further objects and advantages of the present invention are achieved, in general, by a servo drive system utilizing control signal generating means such as impedances, or the like to generate predetermined command signals which are sequentially selectively coupled through a counter to a servo drive system coupled to drive a member such as an articulated arm or the like to preselected physical displacements.

The counter supports a number of stages, one stage for each step required for the program desired. Each stage of the counter contains a terminal which is effectively coupled to ground only when the stage associated with the terminal is energized. At all other times the terminal is effectively isolated from ground. In operation, the various stages of the counter are progressively energized, from the first stage to the last stage, only one stage being energized at any specific instant. Thus, at any specific instant, only that terminal that is associated with an energized stage will be coupled to ground. Now, if a separate relay were interposed between a source of potential and the terminal of each stage, each relay will be selectively activated when the stage associated with the relay is activated. It is the activation of the stage that completes the circuit by coupling the terminal to ground.

An impedance having a discrete value and coupled to the input of a serve drive means is associated with each relay. Thus, energization of a relay through the activation of a stage of the counter will couple an impedance having a discrete value to a servo drive system to control the displacement of a servomotor.

The coupling of an articulated arm to the servomotor will result in the arm being selectively driven to a desired position in space. Progressive activation of the stages of the counter will result in other impedances being coupled to the servo drive system, and the articulated arm will be progressively stepped from point to point until the desired sequence or program has been completed.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings wherein:

FIGS. 1A, 1B, 1C and 1D, when positioned as shown in FIG. 2 illustrates a schematic diagram of structure in accordance with the principles of the invention.

Referring now to the drawing, there is illustrated structure for accurately programming a servo drive system to sequentially progressively drive an articulated arm to a plurality of preselected points in space. A control signal generating means 20, one for each axis of freedom or movement of the articulated arm desired, supports a plurality of impedances or the like each being sized or adjusted to generate a discrete signal. In control signal generating means 20, a potentiometer 22 is coupled between a ground terminal and a source of positive potential. Normally open contacts 24 of a relay 26 interposed between said source and said potentiometer selectively enables the potentiometer to be energized. The sliding contact 28 of the potentiometer 22 is adjusted to provide a signal representative of a discrete physical displacement of the servo drive for a first position along a first axis of freedom of the articulated arm, and the signal that appears on the sliding contact 28 is selectively fed through normally open contacts 30 of relay 26 to an error detector 32. An indicator light 34 coupled across a source of electrical energy is selectively energized when series positioned normally open contacts 36 of relay 26 close to indicate the energization of relay 36 and, therefore, the energization of potentiometer 22. Potentiometer 22, through its sliding contact 28 provides a discrete signal which is fed to drive the servo drive to a preselected position.

A second potentiometer 38 which can be representative of a second displacement of the servo drive and, therefore, a second position along a first axis of freedom of the articulated arm is provided. Potentiometer 38 is coupled between a ground terminal and a source of positive potential through normally open contacts 40 of a relay 42. The relay 42 selectively enables the potentiometer to be energized. The sliding contact 29 of the potentiometer 38 is positioned to provide a signal representative of a discrete physical displacement of the servo drive and, therefore, of the articulated arm for a second position, and the signal that appears on the sliding contact 29 is selectively fed through normally open contacts 44 of relay 42 to the error detector 32. An indicator light 46 coupled across a source of electrical energy is selectively energized when series positioned normally open contacts 48 of relay 42 close to indicate the energization of relay 42.

In a similar manner, other potentiometers are provided to drive the servo drive to other preselected positions. Thus, potentiometer 50 and indicator light 52 in combination with relay 54 and its associated contacts provides a signal for driving the servo drive and the articulated arm to another preselected position along an axis of freedom; and, potentiometer 56 and indicator light 58 in combination with the relay 60 and its associated contacts provides a signal for driving the servo drive and the articulated arm to still another preselected position along an axis of freedom; and, potentiometer 62 and indicator light 64 in combination with the relay 66 and its associated contacts provides a signal for driving the servo drive and the articulated arm to still another preselected position along an axis of freedom. In a continuing manner, it readily becomes apparent that a specific potentiometer and indicator light in combination with a relay and its associated contacts can be provided to generate a signal which can be used for driving the servo drive and, therefore, the articulated arm to various preselected positions desired. Energization of the light indicates visually the potentiometer energized.

The signals from the energized potentiometers of the control signal generating means 20 are sequentially selectively fed to an error detector 32 and servoamplifier 272 which cooperates to control a servo drive to accurately position an articulated arm along a desired path point to point.

Referring specifically to the error detector 32, the feedback signal from a feedback potentiometer 33 representative of the position of the articulated arm and the signal from the control signal generating means 20 representative of the position desired for the articulated arm are each fed to a differential amplifier 70 which can be of type NO. 709C manufactured by Fairchild Semiconductor, a division of Fairchild Camera and Instrument Corporation and having terminals 1, 2, 3, 4, 5, 6, 7, 8.

The signals from the potentiometers of the control signal generating means 20 are selectively fed through a 2,000 ohm resistor 72 in series with a 100,000 ohm resistor 74 to ground. The common connection of the resistors 72, 74 is connected to terminal 3 of amplifier 70.

The feedback signal is derived from potentiometer 33 and is fed through a 2,000 ohm resistor 76 to terminal 2 of amplifier 70. Terminal 7 is coupled to a source of positive potential of 12 volts, and terminal 4 is coupled to a source of negative potential of 12 volts. Terminal 5 is coupled to terminal 6 through a condenser 78 of 220 pf.; and terminal 2 is coupled to terminal 6 through a resistor 80 of 100 k. ohms; and, terminal 1 is coupled to terminal 8 through a condenser 82 having a value of 0.005 µf. in series with a resistor 84 having a value of 1.5 k. ohms The signal appearing on terminal 6 of differential amplifier 70 is fed through a resistor 86 having a value of 1 k. ohms to the number 2 input terminal of a comparator 88 having terminals 1, 2, 3, 4, 7, and 8; and through a resistor 90 having a value of 1 k. ohms to the number 3 input terminal of a comparator 92 having terminals 1, 2, 3, 4, 7, 8, each comparator being similar to type 710C manufactured by Fairchild Semiconductor.

Referring to comparator 88, two diodes 94, 96 coupled in series are interposed between a ground terminal and a source of positive potential of 5 volts, the junction of the two diodes being coupled to terminals 2. Terminal 1 is coupled to ground, Terminal 8 is coupled to a source of positive potential of 12 volts, terminal 4 is coupled to a source of negative potential of 5 volts, and terminal 7 is coupled to terminal 2, through a resistor 98 having a value of 100 k. ohms. Terminal 3 is coupled to the junction of resistor 100 having a value of 11 k. ohms and resistor 102 having a value of 1 k., the resistors 100, 102, being interposed between ground and a source of positive potential of 12 volts.

The connections to the various terminals 1, 4, 7 and 8 of comparator 92 are similar to the connection to the terminals 1, 4, 7 and 8 of comparator 88. Terminal 3 of comparator 92 is coupled to the junction of two diodes and the output terminal of amplifier 70 in a manner similar to terminal 2 of comparator 88; and terminal 1 of comparator 92 is coupled to the junction of two resistors in a manner similar to terminal 3 of comparator 88.

Referring to comparator 92, terminal 1 is connected to a ground terminal, terminal 8 is connected to a source of positive potential of 12 volts, terminal 4 is connected to a source of negative potential of 5 volts, and terminal 7 is connected to terminal 2 through a resistor 104 having a value of 100 k. ohms. Terminal 2 is coupled to the junction of resistors 106 having a value of 1 k. ohms and resistor 108 having a value of 11 k. ohms which are interposed between ground and a source of negative potential of 12 volts.

The signal appearing on terminal 7 of comparator 88 is fed through a diode 110 to the base terminal of a transistor 112. The signal appearing on terminal 7 of comparator 92 is fed through a diode 114 to the base terminal of a transistor 116. The base terminal of transistor 112 is connected to a source of positive potential of 5 volts through a resistor 118 having a value of 3 k. ohms; and to a source of positive potential 24 volts through a diode 120 in series with a resistor 122 having a value of 47 k. ohms. The base terminal of transistor 116 is connected to a source of positive potential of 5 volts through a resistor 124; and to a source of positive potential of 24 volts through a diode 126 in series with resistor 122. The emitter of each transistor 112, 116 is connected to a ground terminal. The collector of transistor 112 is coupled to a source of positive potential of 24 volts through a resistor 128 having a value of 47 k. ohms, and to a control network 130 through a diode 132. The collector terminal of the transistor 112 is also coupled to a source of positive potential of 24 volts through a lamp 134, energization of lamp 134 indicating the activation of transistor 112 and the presence of an error of the position of the servo drive in a first direction. The collector of transistor 116 is coupled to a source of positive potential of 24 volts through a register 136 having a value of 47 k. ohms and to a control network 130 through a diode 138. The collector terminal of the transistor 116 is also coupled to a source of positive potential of 24 volts through a lamp 140, energization of lamp 140 indicating the activation of transistor 116 and the presence of an error of the position of the servo drive in a second direction. Resistor 128 and diode 132 in combination with resistor 136 and diode 138 form an AND-gate 139.

The signals which are representative of the error of the servo drive appear on the collectors of the transistor 112, 116 and are fed to NAND-gates 142 and 144 and to AND-gate 146. NAND-gate 142 supports two input terminals 148, 150; and NAND-gate 144 supports two input terminals 152, 154. Terminals 148 and 154 of NAND-gates 142, 144 are coupled to receive the error signal from the transistor 112, 116; and are also coupled to a source of positive potential through a resistor 156 having a value of 47 k.ohms Terminals 150 and 152 of NAND-gates 142, 144 are coupled to a source of positive potential 24 volts through a resistor 158 having a value of 13 k. ohms. A cycle switch is coupled to terminals 150 and 152 of AND-gates 142 and 144. When the cycle command switch is in the open position so that as not to ground terminals 150 and 152, a cycle command signal may be considered to be present.

Referring to NAND-gate 142, input terminal 148 is coupled through a diode 185 in series with a resistors 187 having a value of 6.8 k. ohms to the base terminal of a transistor 189. Input terminal 150 is coupled through a diode 191 in series with resistor 256 and capacitor 258 to ground. Resistor 256 has a value of 220 ohms and capacitor 258 has a value of 100 µf. The junction of diode 185 with resistor 187 and of diode 191 with resistor 256 is coupled to a source of positive potential of 24 volts through a resistor 193 having a value of 4.7 k. ohms The emitter terminal of transistor 189 is coupled to ground and the collector terminal is coupled to a source of positive potential of 24 volts through a resistor 195 having a value of 4.7 k. ohms. The collector terminal of transistor 189 is coupled to the input terminal 141 of NAND-gate 160.

Referring now to NAND-gate 144 input terminal 152 is coupled through a diode 197 in series with a resistor 201 having a value of 6.8 k. ohms to the base terminal of a transistor 203 of the 2N2270 type. Input terminal 154 is coupled through a diode 205 to the junction of diode 197 and resistor 201. A source of positive potential of 24 volts is coupled through resistor 207 having a value of 4.7 k. ohms to the junction of diode 197 and resistor 201. The base terminal of transistor 203 is coupled to a source of negative potential through a resistor 209 having a valve of 13 k. ohms; the emitter terminal is coupled to a ground terminal; and the collector terminal is coupled to a source of positive potential of 24 volts through a resistor 309 having a valve of 27 k. ohms. The collector terminal of the transistor is connected to feed input terminal 143 of NAND-gate 160.

The output signals of NAND-gates, 142, 144 are fed to input terminals 141, 143 of a NAND-gate 160. A source of positive potential of 24 volts is fed through a resistor 162 having a value of 47 k. ohms to input terminal 145 of NAND-gate 160.

Referring to NAND-gate 160, input terminal 141 is coupled through a diode 147 and a resistor 149 having a value of 6.8 k. ohms to the base terminal of a transistor 151 of the 2N2270 type. A source of positive potential of 24 volts is coupled through a resistor 153 having a value of 4.7 k. ohms to the junction of the diode 147 and the resistor 149. A source of negative potential of 12 volts is coupled to the base terminal of the transistor 151 through a resistor 155 having a value of 13 k. ohms. Terminal 145 is coupled through a diode 157 to the junction of diode 147 and resistor 149; and terminal 143 is coupled through a diode 159 to the junction of diode 147 and resistor 149. The emitter terminal of transistor k. ohms is connected to a ground terminal; and, a source of positive potential of 24 volts is coupled through resistor 161 having a value of 27 k.ohms to the collector terminal of transistor 151.

The output signal of NAND-gate 160 is fed through a diode 163 to a step generator 164 which generates single pulse signal or continuously occurring pulse signals.

Referring to the step generator 164, the signal from the NAND-gate 160 which passes through diode 163 is fed to the emitter terminal of a unijunction transistor 165 of the 2N2646 type. A source of positive potential of 12 volts is fed through a resistor 167 having a value of 4.3 k. ohms to the emitter terminal, and a capacitor 169 having a value of 0.47 $\mu f$ is interposed between tee emitter terminal and ground. The base two terminal of the transistor 165 is coupled to a source of positive potential of 12 volts through a resistor 171 having a value of 510 ohms; and base one terminal of the transistor 165 is coupled to a ground terminal through a resistor 173 of 220 ohms.

A resistor 175 having a value of 47 ohms is interposed between base one of the transistor 165 and the input terminal of step driver 177. Step driver 177 comprises a transistor 179 of the 2N2270 type, the resistor 175 being connected to the base terminal of the transistor, the emitter being connected to a ground terminal; and, the collector being connected to a source of positive potential of 24 volts through a resistor 183 having a value of 220 ohms.

A silicon controlled switch type of counter 166 composed of a plurality of stages, one stage being required for each count desired, i.e. 10 stages being provided when 10 discrete counts or count positions are desired, where each stage supports a step terminal 168, an input terminal 170, a set terminal 172, a clear terminal 174 and an output terminal 176.

The step terminal 168 is coupled to the anode terminal of a silicon controlled switch 181 through a resistor 180 having a value of 3 k. ohms in series with a diode 182. The junction of the resistor 180 and diode 182 is coupled through a 0.005 $\mu f$ condenser 184 in series with a 47 k. ohms resistor 186 to the output terminal 176. A resistor 188 having a value of 100 k. ohms is coupled in shunt with diode 182; and the input terminal 170 is coupled to the anode terminal of the silicon controlled switch (SCS) 181. A diode 190 is interposed between the output terminal 176 and the clear terminal 174. A source of positive potential of 24 volts is coupled to the gate-to-anode terminal of the SCS 181 through a resistor 192 having a value of 10 k. ohms, and to the collector terminal of a transistor 194 through a diode 196. An indicator lamp 198 is connected in shunt with the diode 196. Referring to transistor 194, the emitter terminal is connected to a ground terminal and the base terminal is connected directly to the cathode terminal of the SCS 181. A resistor 200 having a value of 5.1 k. ohms is interposed between the base terminal of transistor 194 and ground. The gate-to-cathode terminal of SCS 181 is connected to the base terminal of transistor 194 through a resistor having a value of 30 k. ohms. In the first stage, the set terminal 172 is coupled to the gate-to-anode terminal of the SCS 181.

Each of the stages 204, 206, 208...N of the SCS counter 166 are similar in design and construction to the first stage 201 except for the coupling of the set terminal 172 to the gate-to-anode terminal of the SCS 181. In all of the stages except the first stage, the set terminal 172 is not coupled to the gate-to-anode terminal of the SCS 181, it is left as an unconnected terminal.

The various stages of the SCS counter are connected together to form the complete counter as follows: the step terminals 168 of each of the stages are coupled together, the clear terminals 174 of each of the stages are coupled together; and, the input terminal 170 of each stage other than the very first stage is coupled to receive a signal from the output terminal 176 of the immediately preceding stage.

The output signal of the power amplifier 177, which is a step pulse signal, is coupled to feed the step terminal 168 of stage 201 of the counter. The set terminal 172 is coupled to receive a set pulse signal from one-shot multivibrator 210; and the clear terminal 174 is coupled to receive a clear pulse signal from the one-shot multivibrator 210.

Referring now the the one-shot multivibrator 210, a source of positive potential of 24 volts is fed through a resistor 212 having a value of 4.7 k. ohms to the collector terminal of a transistor 214 of the 2N2270 type. The emitter terminal of the transistor 214 is coupled to ground, and the base terminal is coupled through a 0.1 $\mu f$ capacitor 216 in series with a diode 218 to the collector terminal of a transistor 220 of the 2N2270 type. A source of potential of 24 volts is connected through a resistor 222 having a value of 10 k. ohms to the base terminal of transistor 214, and through a resistor 224 having a value of 4.7 k. ohms to the junction of capacitor 216 and diode 218; and also through a resistor 226 having a value of 47 k. ohms to the collector of transistor 220. The collector terminal of transistor 214 is connected through a resistor 228 having a value of 6.8 k. ohms to the base terminal of transistor 220. The emitter terminal of transistor 220 is connected to a ground terminal. A source of negative potential of 12 volts is connected through a 13 k. ohm resistor 230 to the base terminal of transistor 22o, and the source of negative potential is also connected through a 13 k. ohm resistor 232 to the base terminal of transistor 214. A source of positive potential of 24 volts is fed through a resistor 234 having a value of 5.1 k. ohms in series with a resistor 236 having a value of 5.1 k. ohms to the collector terminal of transistor 214. A diode 238 is interposed between the base terminal of transistor 214 and the junction of resistors 234, 236.

A reset terminal 240 is coupled through a 0.005 $\mu f$ capacitor 242 to the junction of resistors 234, 236. A source of positive potential of 24 volts is coupled through a resistor 244 having a value of 5.1 k. ohms to the reset terminal 240; and a ground is selectively coupled to the reset terminal 240 through a switch 246.

The output signal of the one-shot multivibrator 210 is fed directly to the clear input terminal 174 of stage 201 of the counter 166, and through a 0.005 $\mu f$ capacitor 248 to the set input terminal 172 of stage 201 of the counter 166.

In the operation of this invention, the control network 130 comprises the various circuits required to control the counter to perform a program step. The control network 130 contains three NAND-gate networks 142, 144, 160 which perform the NAND/NOR functions and controls a unijunction pulse generator 164 to step the silicon controlled switch counter 166.

If all of the input signals fed to either NAND-gate 142 or NAND-gate 144 are high (+24 volts), one or both of the outputs of the NAND-gates 142, 144 will be low (at ground potential) and will cause gate 160 to be high which unclamps the free running step generator 164 and steps the counter 166.

The input signals to gates 142 and 144 consists of a cycle command signal at input terminals 150 and 152 (Cycle Command switch open), and the output signal of the error detector 32 passed through gate 139 to input terminals 148 and 154. Normal operation dictates that both of the input signals fed to the gates 142, 144 be high for the counter to step to the next occurring position. A switch 248 which is selectively activated to couple the input terminal 152 to ground selectively inhibits the operation of the gates 142, 144 to provide a dwell condition; an interval of time during which the counter 166 will not step to its next occurring stage.

AND-gate 139 is driven by the error detector (one AND gate being provided for each error detector, there being three error detectors if three degrees of freedom are desired). All of the AND-gates 139 will be high when all of the axes are within their error bands thus indicating that the articulated arm or member associated with the error detectors is at its desired position.

Gate 144 has one additional input terminal 361, a jaw or gripper condition line. The signal on this line must also be high if gate 144 is to be enabled.

Each instant that a particular stage of the counter is activated, a particular terminal associated with that stage of the counter is coupled to ground. At all other times when that stage of the counter is not activated, the terminal is not coupled to ground. Referring specifically to stage 201 of counter 166, each instant that stage 201 is activated or "on," the terminal 250 of that stage is coupled to ground.

To drive a member such as an articulated arm along a desired path having, for example, five discrete points or stations in any one axis, the relays 26, 42, 54, 60, 66 are coupled to the terminals 250 of the various stages of the counter 166. For example, relay 26 is connected to terminal 250 of stage 201; relay 42 is connected to terminal 250 of stage 204; relay 54 is connected to terminal 250 of stage 206; relay 60 is connected to terminal 250 of the next occurring stage of the counter; and, relay 66 is connected to terminal 250 of the next occurring stage of the counter. Activation of any one of the relays will couple an associated impedance to the error 32 to urge the servo drive and, therefore, an articulated arm to a preselected position. Now, as the stage of the counter are sequentially energized, the relays 26, 42, 54, 60, 66 coupled to the terminal 250 of the various stages will be sequentially activated and the articulated arm will be driven to five discrete positions as determined by the impedances 22, 38, 50, 56, and 62. Obviously, to obtain control of 3° of freedom, a relay of the control signal generating means of each axis can be connected to the terminals 250. Thus, each instant that a stage of the counter is activated, three relays will be activated to couple three impedances to the various error detectors to provide control of the articulated arm for the 3° of freedom.

The stepping of the counter progressively couples various impedances to the error detector to advance an articulated arm along a desired path of travel.

If it is desired to operate the gripper, i.e. open the grippers, when stage 201 is activated, terminal 252 of the gripper control 307 is coupled to terminal 250 of stage 201. Upon energization of stage 201, terminal 250 is coupled to ground and all terminals that are coupled to terminal 250 will then be coupled to ground. Therefore, if terminal 252 of gripper control 307 is coupled to terminal 250 of stage 201, energization of stage 201 will couple terminal 252 to ground and self latching relay 251 will be energized to close its associated contact 253. The closing of contact 253 connects a 115 volt source to actuating solenoid 254 which in turn causes the manipulation of grippers 255. The connecting of terminal 252 to ground inhibits the operation of gate 144.

When gate 144 is inhibited by the signal passed through the grounded terminal 252, the only path open to step the counter 166 to its next stage is through gates 142 and 160. However, it should be noted that gate 142 is delayed for approximately 250 ms., by the resistor 256 capacitor 258 network connected to its input.

Therefore, if a gripper or interlock function is programmed to occur at a specific position in space of the articulated arm as represented by the energization of a particular stage of the counter, the counter will remain at the count and will not advance for 250 ms. after the gate 139 passes a high or positive going signal. During this time the error line 260 urges gate 146 to go high to permit the gripper control relay 251 to be energized to perform the associated gripper function.

It is to be noted that the 250 ms. delay can be obtained as desired by coupling the terminal 360 to a ground terminal. This terminal can be coupled to ground by connecting it either to a terminal 250 of a desired stage of the counter 166 or by interposing a manually operated switch between ground and terminal 360.

In this invention, the energization of the next occurring stage of the counter represents the occurrence of the next program step. If, during operation, a program step as represented by the energization of a particular stage is to be skipped, the skip terminal 262 is connected to the terminal 250 of the specific stage of the counter representative of the program step that is to be skipped. Now, when the counter advances to the step of the program that is to be skipped, a ground will be coupled to the skip terminal 262 and the skip terminal will hold the input to gates 146, 160 low to inhibit any gripper function that may have been programmed during energization of that stage and will enable the step generator 164 to continue stepping the counter until a stage that is not to be skipped is reached.

The step generator 164 normally requires 4 ms., to produce a first pulse when it is first activated, but when it is free running the pulse repetition interval is 2 ms. Therefore, if a number of points are to be skipped, the counter steps at a higher rate than normally occurs during the stepping of the counter from one stage to the next in order to arrive at the next desired stage as soon as possible. The rapid advance of the counter is necessary in order to couple the servoamplifier to a command potentiometer as soon as possible as there is no control of the servo drive during the interval of time during switching and drifting of the system can occur. It has been found that it is not desirable to allow the servoamplifiers to drift for more than 25 ms., and, therefore, no more than 11 consecutive program steps, where each stage represents a program step, should be skipped.

The counter can be stepped to any point using the manual step switch 264. Each instant that the manual step switch 264 is pressed, the input to gate 160 is momentarily grounded to allow a single pulse signal to be generated by the step or pulse generator 164. The signal from the generator 164 is fed to and advances the counter one step.

If a large number of steps are required in a program, it may be desirable to step the counter automatically to the next desired program step. By connecting terminal 250 of the next stage desired to the stop terminal 266, and by closing the Auto Step switch 268, the step generator 164 will free run until the terminal 250 of the stage that is coupled to the step terminal 266 is reached to ground the input to the step generator 164 and stop the counter at the stage desired.

The reset one-shot multivibrator 210 is triggered by the reset switch 270 which couples the reset terminal 240 to ground. The reset multivibrator 210 generates a one-half of a millisecond pulse signal which grounds the clear terminal 174 of each stage of the counter 166 to clear all of the stages. Upon completion of the operation of the multivibrator 210, a pulse signal of +24 volts is generated and fed to the set terminal 172 of the first stage of the counter 166 to energize the first stage.

In resetting the counter to its first position, the three potentiometer relays that are coupled to terminal 250 of the first stage are energized to couple a preselected potentiometer to each of the servoamplifiers to control the positioning of the servomotors for the three axes of motion of the articulated arm and the articulated arm is driven by the servomotors to the position desired.

It is to be noted that the reset terminal 240, the input terminal for the reset one-shot multivibrator can be connected to the terminal 250 of any of the stages of the counter 166 to cause the counter to be reset to its first stage when the selected stage is reached.

The error detector consists of a pair of voltage comparators which switch to a different bistable state when the difference between the arm's position and the command position is within a predetermined maximum allowable displacement.

The displacement is measured by summing the feedback potentiometer voltage and the command potentiometer voltage in an integrated circuit differential amplifier having a fixed gain.

The gain of the differential amplifier is determined by the ratio of the feedback resistor 80 to either of the input resistances 72 or 76. Since the value of the potentiometer voltage corresponding to the maximum allowable displacement can be different for the various axes, separate input resistors are provided to change the gain of the amplifier so that its output will correspond to the same voltage reference selected of plus or minus 1 volt.

The summed differential output is compared to two reference voltages which correspond to the upper and lower limits by a pair of voltage comparators. The comparators generate an output signal of −0.5 volts when error voltage is within their respective reference voltages. If the error voltage exceeds the allowable levels, the signal from one of the comparators will switch to +3.5 volts to allow one of the two lamp drivers 112, 116 to conduct through to ground to illuminate its respective lamp and hold gate 139 to ground.

The silicon controlled switch counter 166 functions as a sequentially operated selector switch to couple various desired command position potentiometers and/or gripper functions into the system at each point in the program.

The counter 166 uses silicon controlled switches in an open loop ring counter configuration which can be expanded to any desired number of points.

Each stage i.e., 204, comprises a silicon controlled switch which is anode triggered and coupled to drive a transistor of the 2N2270 type. In operation, a positive pulse signal capacitively coupled from a preceding stage causes the SCS to conduct thus supplying current to the base terminal of the transistor. The transistor conducts only when its respective SCS is on to switch its collector to ground and cause its associated lamp to be energized.

Each collector terminal is connected to a diode isolated terminal 250 to which a command potentiometer relay or other type of control relay can be connected. The relays are coupled between the source of positive potential of 24 volts and the terminals 250 of the various stages of the counter 166 and are energized only when the collector is at ground to complete the circuit by grounding the terminal 250. The diode 196 connected from the collector of the source of positive potential of 24 volts protects the transistor from voltage transients which may be generated by the relay loads.

The counter is stepped by the step line coupled to the step terminal 168 and controlled by the unijunction step generator 164. The step line is pulled to ground potential for 60 microseconds and turns off all stages. Upon returning to a positive potential, the capacitor 184 which is connected to the last conducting stage will be charged and will cause the next stage to conduct.

A common clear line connected to the clear terminal 174 is connected through individual diodes 190, one for each stage, to the anode terminal of each SCS (except in the first stage) and clears the counter when connected to ground.

Since a stage cannot be stepped (energized) until its immediately preceding stage has been energized, the first stage is not cleared at this time and a pulse signal is applied to the set terminal 172 of the first stage when the clear line is returned to a positive potential.

The clear and set pulse signals are generated by a one-shot multivibrator 210 which generates a pulse signal having a time duration of one-half of a millisecond. The reset input terminal 240 of the one-shot can be connected to the terminal 250 of any one stage of the counter 166 and the counter 166 will be reset to stage 1 which is representative of point 1 when the stage that is coupled to the reset input terminal 240 is energized.

In this invention, a servo drive (one for each axis) drives an articulated arm along each of its axis of freedom to position the end of the arm to a desired point in space. The construction and operation of the servo drive system of each of the axes of freedom are all similar in nature and, therefore, to avoid repetition, the servo drive of only one axis of freedom will be described in detail.

The potentiometers 22, 38, 50, 56 are adjusted to generate discrete potentials which, when fed to the servo drive means, represents a discrete displacement of the articulated arm along a specific axis. Each potentiometer is selectively connected to a servoamplifier 272 through the energization of an associated relay.

Each potentiometer is connected across a source of potential, and the sliding contact of each potentiometer is connected to the command input of the servoamplifier only when its respective relay is energized. Relay coil 26 controls the activation of contacts 24, 30 associated with potentiometer 22 and the activation of contact 36 associated with lamp 34. Relay coil 42 controls the activation of contacts 40, 44 associated with potentiometer 38, and the activation of contact 48 associated with lamp 46. In a similar manner, relay coil 54 controls the contacts associated with the potentiometer 50 and the lamp 52; relay coil 60 controls the contacts associated with the potentiometer 56 and the lamp 58; and relay coil 66 controls the contacts associated with the potentiometer 62 and the lamp 64.

One side of each relay coil is connected to a source of positive potential of 24 volts, and the other side of each relay coil is connected to the terminal 250 of a desired stage of the counter 166. Energization of a specific stage of the counter 166 couples the terminal 250 of that stage to ground. Thus, energization of a specific stage of the counter 166 completes the electrical path of a relay coil coupled to the energized stage, and the relay coil is activated to couple its associated potentiometer to the servoamplifier to command the movement of the articulated arm to the programmed position.

The light, i.e. 34, associated with each potentiometer indicates the potentiometer that is currently selected and coupled to the servoamplifier to control the position of the arm.

In this invention it is to be noted that any one potentiometer can be selectively coupled to the servoamplifier a number of times during any particular program by connecting the coil of the associated relay to a number of terminals 250 of various preselected stages of the counter 166.

Additionally, as the number of stages that can be present in the counter 166 can be increased to any desired number, the number of potentiometers can also be increased to any desired number. It is here again noted that each stage of the counter can represent a step of a program, and each potentiometer can represent a position in space of an articulated arm along one of its axis of freedom.

In operation, where three degrees of freedom of the articulated arm are desired, the terminal 250 of each stage of the counter 166 selected to determine a position in space of the articulated arm is coupled to energize simultaneous three relays where each relay couples a potentiometer to its respective servoamplifier, one for each degree of freedom.

The servoamplifier 272 is a single stage differential amplifier coupled to a constant current source and provides the power amplification required to operate the servo drive from the command and feedback potentiometers.

The amplifier incorporates a balance control 274 to compensate for variations in components and the servo drive. The balance control 274 is adjusted to eliminate any drift of the articulated arm when the inputs to the amplifier are shorted together and the machine is at its normal operating temperature.

To insure reliable operation, the amplifier can be designed to provide more gain than is required for stable operation to allow for component variations and differences between the various axes of freedom. A gain control 276 is provided to reduce the gain to a stable value for various conditions of load, speed and program motions.

To provide an invention having versatility, certain control functions have been provided. One such control is the single step control. The single step contact 264 couples the input of NAND-gate 160 to ground to allow the unijunction step generator 164 to produce a single pulse signal which advances the counter 166 one stage to the next occurring stage.

Another control is the dwell control. The dwell switch 248 allows the dwell command to be disconnected to permit the counter 166 to step the system through a program. However, closing of the switch 248 prevents the counter 166 from advancing or stepping automatically. Still another control is the auto step control 268. The auto step button 268 grounds the input to NAND-gate 160 and allows the unijunction step generator 164 to run continuously. This control is normally used in combination with the stop terminal 266. By connecting the stop terminal 266 to the terminal 250 of any desired stage of the counter 166, the counter will advance until the stage that is connected to the stop terminal 266 is energized.

To drive an articulated arm through a specific program with this invention, the number of steps, the position of the articulated arm along each axis of freedom for each step, the gripper function at each step and the like must first be determined. A potentiometer for each axis at each point should be selected and connected to the output terminal 250 of the corresponding stage of the counter. To prevent drifting of the articulated arm, a potentiometer should be connected to the servo drive of each axis at each step used. In complex programs, a potentiometer can be used several times if the position of an axis is repeated at any instant during the various steps of the program. Additionally, gripper commands should be connected to the counter whenever they occur in the program. The initial position of the gripper should be programmed to the first point of the program which is represented by the first stage of the counter to preset its position when the unit is first turned on. The point following the last programmed step should be connected to the reset input 240 to return the counter to its first stage and allow the program to recycle.

Obviously many modifications and variations of the present invention are possible in the light of the above teaching. It is, therefore, to be understood that the invention may be practiced otherwise than as specifically described herein.

What is claimed is:

1. A program selecting control means for a movable member driven by a servo means comprising a control signal generating means for generating control signals representative of desired physical displacements of the servo means, a counter having at least two stages which are sequentially energized, means coupled to the input of said counter for providing signals to sequentially energize said counter stages, means coupled to respective stages of said counter and independently operative in response to a condition of a respective counter stage to couple respective control signals from said control signal generating means to said servo means.

2. The combination of claim 1 comprising a control network responsive to said servo means and coupled to control the operation of said counter.

3. The combination of claim 2 wherein said control network includes means to advance said ring-type of counter at a predetermined rate.

4. The combination of claim 3 wherein said control network includes means to selectively retard the advance of said ring-type of counter.

5. The combination of claim 4 wherein said control network includes means to selectively accelerate the advance of said ring-type of counter.

6. The combination of claim 5 wherein said control network includes means to inhibit the advance of said counter until said servo means produces a desired physical displacement of said movable member.

7. The combination of claim 6 comprising gripper control means interposed between said control network and said ring-type of counter to operate selectively gripper means coupled to said member driven by said servo means, and delay means fed by said gripper control means to inhibit the advance of the ring-type of counter for a preselected interval of time sufficient to permit operation of the gripper means.

8. A program selecting control means for a member driven by a servo means comprising a first impedance to generate a first value signal representative of a first desired physical displacement of the servo means; a second impedance to generate a second value signal representative of a second desired physical displacement of the servo means; a ring counter having at least two stages, each stage having a terminal electrically coupled to a given potential only when the stage associated with the terminal is energized, first means coupled to the terminal of said first stage of the ring counter to feed the first value signal from the first impedance to the servo means when said first stage is energized, second means coupled to the terminal of said second stage of the ring counter to feed the second value signal from the second impedance to the servo means when said second stage is energized, and a control network coupled to control the operation of said ring counter.

9. The combination of claim 8 wherein said control network comprises a pulse generator to step said ring counter, means coupled to inhibit the operation of said pulse generator to stop the advance of the ring counter.

10. The combination of claim 9 wherein said pulse generator comprises a unijunction diode and said ring counter comprises stages having silicon controlled switches.

11. The combination of claim 9 comprising gripper control means interposed between said control network and a terminal of a third stage of the ring counter to operate selectively gripper means coupled to said member driven by said servo means, delay means fed by said gripper control means to inhibit the advance of the ring counter for a preselected interval of time sufficient to permit completion of the operation of the gripper means, and means coupled to sequentially reactivate each of the stages of said ring counter after activation of the last stage of said ring counter.

12. Means for controlling the movement of a movable member which is driven by an actuating means, comprising a control signal generating means for generating a plurality of signals representative of desired physical displacements of said member, a counter having a plurality of stages which may be sequentially energized, means coupled to respective stages of the counter for coupling selected control signals from the control signal generating means to the actuating means when predetermined stages of the counter are energized, means providing a feedback signal representative of the instantaneous position of said member, means for comparing said feedback signal with a selected signal from the control signals generating means and for providing a counter step signal when the feedback signal and a selected signal from the control signal generating means have a predetermined relationship, and means coupling said step signal to said counter for controlling the stepping operation of the counter.

13. The combination claimed in claim 12 wherein said movable member includes a gripper control means for actuating a gripper member, means for coupling said gripper control means to a given stage of said counter for actuating said gripper control means to thereby manipulate said gripper member when said given stage of the counter is energized.

14. The combination claimed in claim 13 and further including, delay means coupled to said means for generating a counter step signal and responsive to the actuation of the gripper control means for delaying the generation of subsequent counter step signals after said given stage is energized.

15. The combination claimed in claim 12 and including first and second gating means each having an input coupled to receive the output signal from the means for comparing the feedback signal and a selected control signal and each having its output coupled to a counter step signal generator, a first one of said gating means having delay means for delaying its output signal, the second one of said gating means having means for inhibiting its operation independently of the operation of said first one of the gating means, whereby the generation of counter step signals may be delayed by inhibiting said second gating means.

16. The combination claimed in claim 12 wherein the control signal generating means is comprised of a plurality of potentiometers which are adapted to be energized to provide respective control signals.

17. The combination claimed in claim 12 wherein the means for proving a counter step signal includes step signal generator means and means selectively operable independently of the comparing means to render the step signal generating means operable to produce a plurality of successively occurring step signals.

18. The combination of claim 17 wherein the selectively operable means is coupled to one or more stages of the counter and is operable upon energization of the counter stages to which it is coupled.

19. A program selecting control means for a movable member driven by a servo means comprising a control signal generating means for generating a plurality of signals representative of respective desired physical displacements of said member, a counter having a plurality of stages which may be successively and selectively energized, means coupled to respective stages of the counter for coupling respective signals from the control signal generating means to the servo means when a respective stage of the counter is energized, means providing a feedback signal representative of the instantaneous position of said member, means for comparing said feedback signal with a selected one of the signals from the control signal generating means and for providing a zero error signal when a feedback signal and the selected signal from the control signal generating means are substantially equal, and means responsive to the zero error signal to control the operation of said counter.

* * * * *